(12) United States Patent
Lepikhin et al.

(10) Patent No.: US 8,374,428 B2
(45) Date of Patent: Feb. 12, 2013

(54) COLOR BALANCING FOR PARTIALLY OVERLAPPING IMAGES

(75) Inventors: Maksim Lepikhin, Boulder, CO (US); Leon Rosenshein, Louisville, CO (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 12/960,506

(22) Filed: Dec. 5, 2010

(65) Prior Publication Data

US 2012/0141014 A1    Jun. 7, 2012

(51) Int. Cl.
*G06K 9/00* (2006.01)
*H04N 5/225* (2006.01)

(52) U.S. Cl. .................. 382/167; 382/154; 348/218.1

(58) Field of Classification Search .................. None
See application file for complete search history.

(56) References Cited

U.S. PATENT DOCUMENTS

| | | | |
|---|---|---|---|
| 4,047,202 A | 9/1977 | Poetsch | |
| 6,385,349 B1* | 5/2002 | Teo | 382/284 |
| 6,456,323 B1* | 9/2002 | Mancuso et al. | 348/218.1 |
| 6,694,064 B1 | 2/2004 | Benkelman | |
| 7,298,892 B2 | 11/2007 | Spaulding et al. | |
| 2003/0133019 A1* | 7/2003 | Higurashi et al. | 348/218.1 |
| 2005/0088534 A1* | 4/2005 | Shen et al. | 348/218.1 |
| 2006/0115182 A1* | 6/2006 | Deng et al. | 382/284 |
| 2006/0268131 A1* | 11/2006 | Cutler | 348/239 |
| 2007/0126863 A1* | 6/2007 | Prechtl et al. | 348/43 |
| 2007/0268534 A1 | 11/2007 | Duan et al. | |
| 2008/0143820 A1* | 6/2008 | Peterson | 348/36 |
| 2008/0170803 A1* | 7/2008 | Forutanpour | 382/284 |
| 2008/0266408 A1* | 10/2008 | Kim | 348/218.1 |
| 2009/0097744 A1* | 4/2009 | Schultz et al. | 382/167 |
| 2009/0169102 A1* | 7/2009 | Zhang et al. | 382/167 |
| 2010/0045815 A1* | 2/2010 | Tsuchiya | 348/222.1 |
| 2010/0067823 A1 | 3/2010 | Kopf et al. | |

OTHER PUBLICATIONS

He, et al., "Single Image Haze Removal Using Dark Channel Prior", 2009 IEEE Conference on Computer Vision and Pattern Recognition (CVPR), Retrieved at <<http://pages.cs.wisc.edu/~dyer/cs638/papers/dehaze-cvpr09.pdf>>, Jun. 20-25, 2009, 8 pages.

Gruen, et al., "Automatic Reconstruction and Visualization of a Complex Buddha Tower of Bayon, Angkor, Cambodia", in Proceedings 21.Wissenschaftlich-Technische Jahrestagung der DGPF, Konstanz, Retrieved at <<http://www.geod.ethz.ch/p02/general/persons/AG_pub/Konstanz_BayonPaper.pdf>>, Sep. 4-7, 2001, pp. 289-301.

(Continued)

*Primary Examiner* — Li Liu

(57) ABSTRACT

When photographs are to be combined into a single image, haze correction and/or color balancing may be performed. The photographs may be analyzed and left-clipped in order to darken the photographs and to increase the density of pixels in the low-luminosity region, thereby decreasing the perception of haze. When the photographs are combined into one continuous image, tie points are selected that lie in regions where the photographs overlap. The tie points may be selected based on visual similarity of the photographs in the region around the tie point, using a variety of algorithms. Functions are then chosen to generate saturation and luminosity values that minimize, at the tie points, the cost of using the generated values as opposed to the actual saturation and luminosity values. These functions are then used to generate saturation and luminosity values for the full image.

20 Claims, 10 Drawing Sheets

OTHER PUBLICATIONS

Zitnick, et al., "Stereo for Image-Based Rendering using Image Over-Segmentation", International Journal of Computer Vision, vol. 75, issue 1, Retrieved at <<http://hci.iwr.uni-heidelberg.de/mip_teaching/3D-filme/paper1/zitnick_06_image-based-rendering-using-over-segmentation.pdf>>, dated Jul. 11, 2006, published Oct. 2007, 32 pages.

"OrthoVista Direct", retrieved at << http://www.orthovista.com/ovabouthtml >> and << http://www.orthovista.com/ovproductfaq.html , dated 1999, 7 pages.

Chandelier, et al., "A Radiometric Aerial Triangulation for the Equalization of Digital Aerial Images and Orthoimages", Journal of the American Society for Photogrammetry and Remote Sensing, Feb. 2009, pp. 193-200, vol. 75, No. 2.

* cited by examiner

COLOR BALANCING FOR PARTIALLY OVERLAPPING IMAGES

BACKGROUND

Various applications use imagery that is actually derived from a plurality of separate photographs. For example, mapping or "Earth view" applications often make use of aerial photographs. Since each aerial photograph typically covers a small area on the ground, the overall image of a geographic region is normally made of several aerial images stitched together.

When aerial imagery is used, there are two problems that typically arise. One problem is that aerial photographs often appear hazy, since the photographs may be taken through several thousand feet of moisture and particulates. Another problem is that spatially overlapping photographs may be taken under different lighting conditions, or possibly even at different times of day or year. Thus, when the two photographs are stitched together, these differences may make the boundary between the two photographs visually apparent.

SUMMARY

When photographs are combined into a continuous image, haze removal and color balancing may be applied to the photographs, thereby producing a higher quality image. In one example, the photographs are aerial photographs that are being used to show a "birds eye" view of a geographic area as part of a mapping application. However, the techniques described herein may be used in any context, and for any type of application.

In order to remove haze from images, the images are analyzed in the red/green/blue (RGB) color space to produce cumulative distribution functions (CDFs) for each of the red, green, and blue channels. Haze generally manifests itself as a flat portion near the low-luminosity portion of each CDF curve, which corresponds to there being some number of zero values in the channel, but very few low positive values. Thus, each of the CDFs is left-clipped, and then re-scaled. The values of each of the pixels are then reassigned based on the re-scaled CDFs, thereby resulting in overall darkening of the image, but adding richness or depth to the low luminosity range. One example way to perform this haze correction is to use a weighted average of several CDFs—one created from the image itself, some created from sub-images, and some created from super-images.

Once haze has been corrected, the colors of photographs that are being stitched together may be balanced in order to smooth out transitions across the images. In the hue-saturation-luminosity (HSL) color space, apparent differences in color balance across adjacent photographs normally manifest themselves as different saturation and lightness values, so balancing color across photographs may involve modifying the saturation (S) and luminosity (L) values. A set of images is first projected onto a 3-D model, such as a Digital Elevation Model or Digital Terrain Model (DEM or DTM) of a geographic area. In regions where the photographs overlap, plural images are projected onto the same surface region. Within a region that contains overlapping photographs, tie points are chosen. A polynomial function is then used to approximate the saturation (S) values at each of the tie points, and the coefficients of the polynomial are chosen to minimize the differences between the actual S values at the tie points, and the values produced by the function. A polynomial function is chosen for the luminosity (L) values using a similar process. Once the functions have been chosen, those functions are used to calculate the saturation (S) and luminosity (L) values for each pixel, and the S and L values are for those pixels are reassigned using the calculated values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
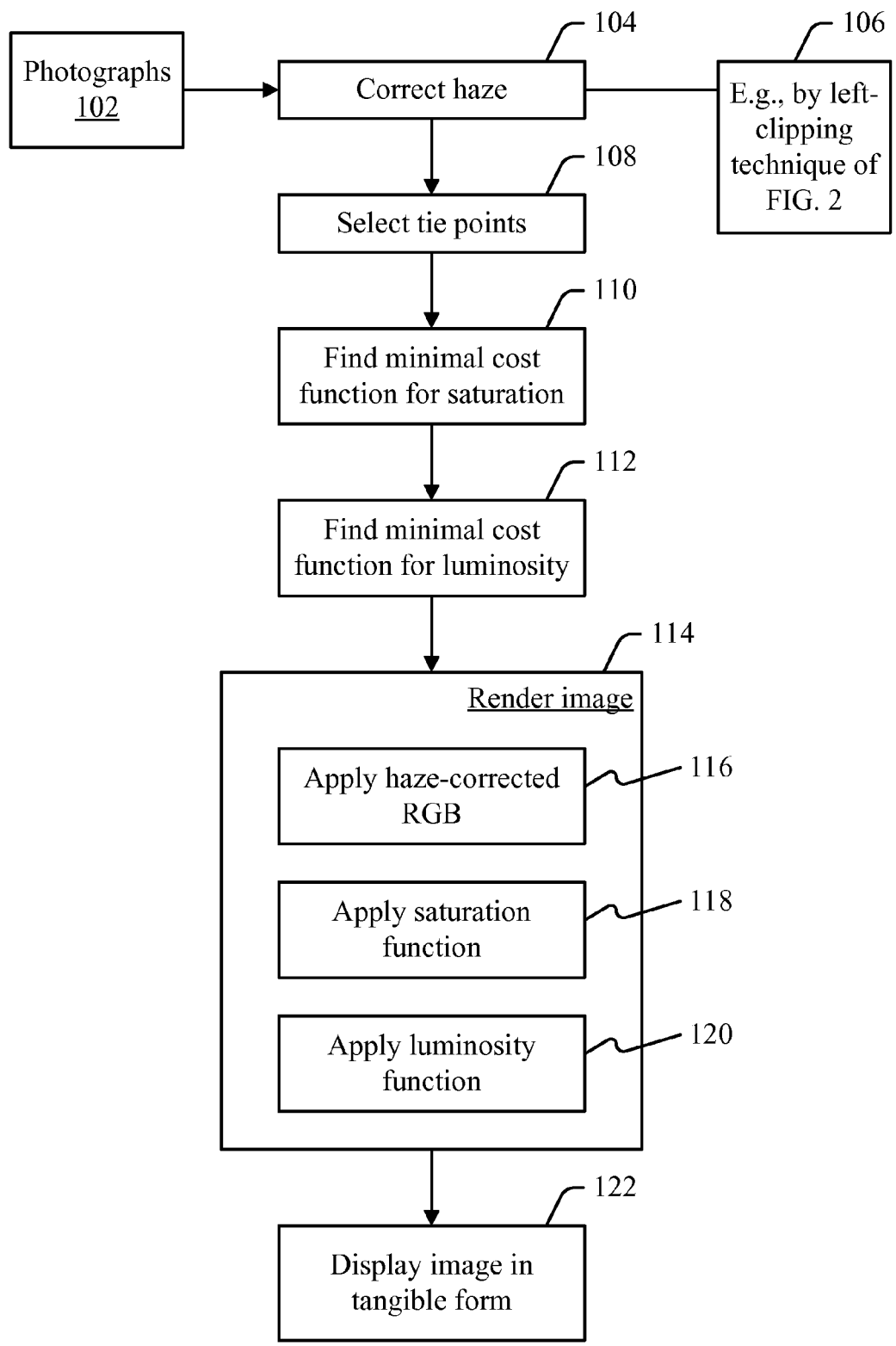
FIG. 1 is a flow diagram of an example process in which haze correction and/or color balancing may be performed.

Many applications make use of imagery that is created by combining several photographs together. One example of this type of imagery is an aerial view of a geographic region. Typically, an airplane flies over a region at a height of about fifteen to twenty thousand feet, taking photographs at certain intervals. Typically, the photographs cover squares that are approximately half a kilometer on each side. (The photographs are normally taken from the side of the airplane at an angle to the ground, so the shape of the region covered by each photograph can be more precisely described as a trapezoid. However, for the purposes of the description herein, each aerial photograph can be understood as covering a region that is approximately square.)

When the photos are taken, weather and atmospheric conditions can lead to various quality problems with the photographs. One such problem is haze—the result of taking a photograph through several thousand feet of air laden with moisture and particulates. Another problem is that the photographs may have different lighting conditions, exposure times, camera parameters, etc. As the airplane moves through the region to be photographed, changing atmospheric and light conditions may cause the prevailing colors and lighting on the different photographs to look different from each other. In some cases, photographs may be combined that were taken on different days, or at different times of day, thereby resulting in even greater color imbalance across the photographs.

Combining such photographs may cause the combined image to appear "choppy", as differences in lighting conditions, exposure times, camera parameters, and/or haze level may make the boundaries between the different photographs visually apparent. Thus, when images are combined, there may be reason to remove the appearance of haze from the photographs, and to try to smooth out the colors across different images.

The subject matter described herein provides techniques to remove haze and to smooth the color balance across different photographs. The subject matter herein may be used as part of the process of combining aerial photographs into a single image of a geographic region. However, the techniques described herein may be used to combine photographs in any context—e.g., stitching of ground level photos to make a panorama, stitching of photos of a room to create a navigable 3-D model of the room, etc.

Haze normally manifests itself in the low-luminosity region of an image's color distribution. That is, in each of the red, green, and blue color channels in RGB space, a hazy photograph typically will have some number of zero values in each channel, but will have very few values that are low but positive. For example, in a hazy photograph with an 8-bit blue channel, 10% of the pixel might have zero value, and almost no pixels might have values that are between zero and forty. If a cumulative distribution function (CDF) is graphed for the blue channel (with the pixel value on the horizontal axis of the graph, and the cumulative percentage on vertical axis), this pattern would show up as a flat, or almost flat, portion of the CDF curve near the left side of the graph. (A similar pattern may exist in the red and green channels, although haze tends to manifest more prominently in the blue channel.) Thus, in order to remove haze, the CDFs for the red, green, and blue channel are analyzed to determine how much of the left-side portion of each graph has a slope that stays below a threshold value. The CDF in each channel is left-clipped to remove the near-flat portion of the graph on the left, and the clipped CDF is then stretch to cover the clipped portion. The result is that pixel values are generally scaled downward, thereby reducing the overall lightness of an image, but the low-luminosity portion of the color space (which sparsely populated in a hazy photograph) is filled in, thereby giving the image a less-washed-out appearance. In one example, the actual haze-corrected pixel values are derived not from a single left-clipped CDF, but rather from the average of several left-clipped CDFs. One way to create this average is to create CDFs for the image itself, as well as several sub-images and super-images. All of the CDFs may be left-clipped and re-scaled, and the re-scaled CDFs may be used to generate values. The final value of a particular pixel in a particular channel is then calculated as a weighted average of the various generated values.

Among the photographs that are to be combined into a continuous image, the colors among these images may be balanced using techniques described herein. It is common for the color balance among the photographs to differ in the sense that they may have different overall saturation and luminosity in the HSL color space. Thus, color balancing may seek to smooth out the saturation and luminosity across the photographs. In order to balance color across the photographs, the photographs are first projected ("painted") onto a 3-D model. In the example in which the photographs are aerial photographs of the ground, the 3-D model is a model of the topography of the terrain that is being photographed. If the photographs overlap, then there will be regions that are covered by two or more photographs. For these regions, "tie points" are selected. A tie point is a point on the 3-D model that can be painted by more than one photograph. Using algorithms that are described below, the tie points are selected based on how close the pixel value in one photograph is to the pixel value in the other photograph, at the tie point.

Once a set of tie points is selected, the saturation and luminosity are modeled using functions. In one example, the functions multiply the initial channel value by an exponential function whose exponents are third-degree polynomials of the pixel coordinates. The balancing algorithm seeks to minimize the "cost" of a function, by choosing coefficients of the polynomial that minimize the difference between the actual value of a pixel (in the saturation or luminosity channel) and the value produced by the function. One function is chosen to represent the luminosity, and another function is chosen to represent the saturation. Once a polynomial function has been chosen for the luminosity, that function is used to generate luminosity values for all of the pixels in the region to be balanced, and the luminosity values for those pixels are reassigned using the function. Similarly, once a polynomial function has been chosen for the saturation, that function is used to generate saturation values for the pixels in the region to be balanced, and the saturation values for those pixels are reassigned accordingly.

The result of combining the haze-removal process and the color balancing process is an image that appears less hazy than the original photographs from which it is derived, and in which transitions between the photographs have been smoothed out.

Turning now to the drawings, FIG. 1 shows an example process in which haze correction and/or color balancing may be performed. Before turning to a description of FIG. 1, it is noted that the flow diagrams contained herein (both in FIG. 1 and in FIGS. 2, 6, 7, 8, 9, and 10) show examples in which stages of processes are carried out in a particular order, as indicated by the lines connecting the blocks, but the various stages shown in these diagrams can be performed in any order, or in any combination or sub-combination.

The input to the process of FIG. 1 is a set of one or more photographs 102. With regard to these photographs, haze in the images may be corrected at 104. Haze correction may be performed in any appropriate manner. However, one example way to perform haze correction is the left-clipping technique 106, which is described in detail below in connection with FIG. 2.

Blocks 108-120 address color balancing. Color balancing may be performed on haze-corrected photographs, although the techniques described herein could also be used to balance colors across photographs that have not been haze-corrected.

At 108, tie points are selected. As noted above, tie points are points that have been photographed in at least two images. Example ways of selecting the tie points are described below in connection with FIGS. 6-9.

At 110, a function is found to generate saturation values, where the function is chosen to minimize the cost of using the function-generated values instead of the actual tie point saturation values. (Cost can be defined in a variety of ways. In general, cost describes how much the function-generated values differ from the original pixel values. An example cost function is described below in connection with FIG. 10.) Likewise, at 112, a function is found to generate luminosity values, where the function is chosen to minimize the cost of using the function-generated values instead of the actual tie point luminosity values. In one example, the saturation and luminosity are modeled as exponentials of third-degree polynomial functions of each pixel's x and y coordinates, and finding a minimal-cost function involves choosing coefficients for the function that minimizes the difference between the function value at the tie points' coordinates, and the actual pixel values of the tie points. Example ways of choosing these functions are described below in connection with FIG. 10.

At 114, an image is rendered that has been haze-corrected and/or color balanced. In HSL space, the rendering of the image may involve three components. In order to render a pixel of the image, the pixel is adjusted to reflect application of the haze-corrected RGB (block 116), the function-generated saturation value (block 118), and the function-generated luminosity value (block 120). The rendered image may be displayed in a tangible form at 122—e.g., by taking the appropriate physical actions to cause the image to be shown on a display device.

Figure 2:
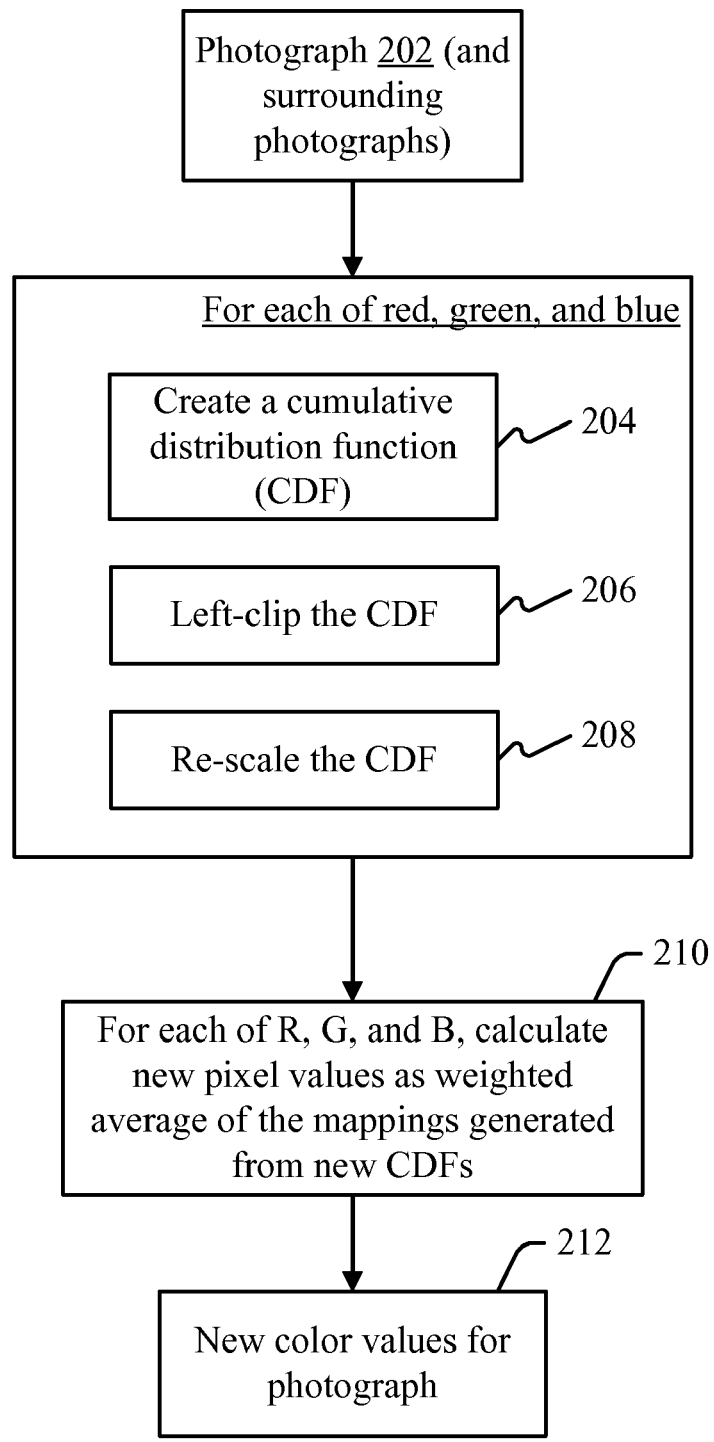
FIG. 2 is a flow diagram of an example process of correcting haze.

FIG. 2 shows an example process of correcting haze. The input to the process of FIG. 2 includes photograph 202. In an example implementation, the input may also include surrounding photographs, since some example implementations may make use of "super-images" of the photograph. (As discussed above, photographs may be stitched together to form a larger image; thus, a "super-image" may be a region of the larger image that contains the photograph itself, as well as some additional portion of the larger image.)

The photograph may be represented in RGB space, where each pixel has values for the red, green, and blue channels. For each of these channels in the photograph, a cumulative density function is created (at 204), which represents the distribution of values in that channel. For example, suppose that the photograph is represented at a color depth that has eight bits in each channel, so that each pixel has red, green, and blue values that range from zero to 255. The cumulative distribution function for a given channel maps each value in the range zero to 255 to the percentage of pixels whose value is less than or equal to than that value. Examples of such cumulative distribution functions are shown in FIG. 3.

Figure 3:
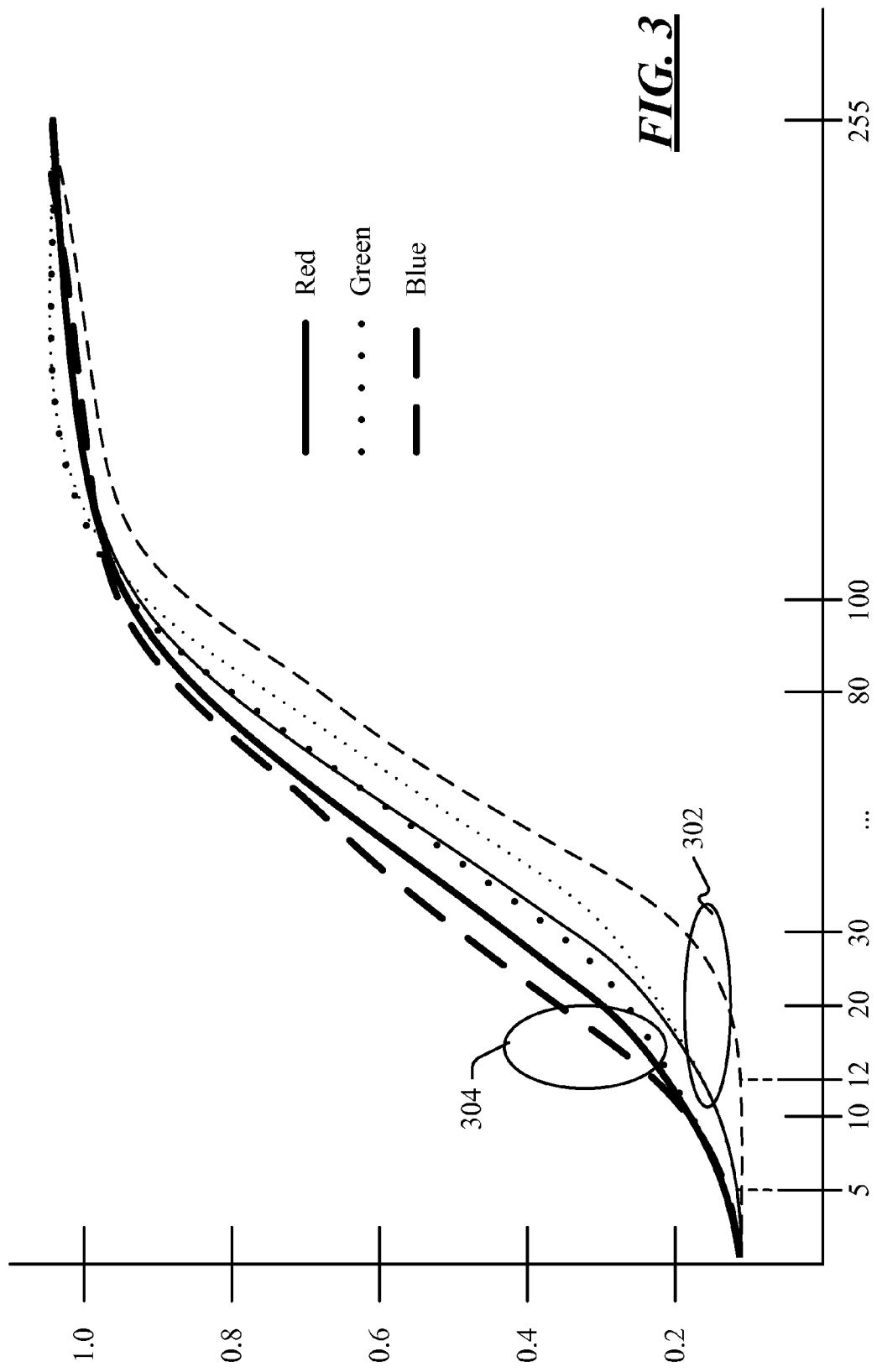
FIG. 3 is a block diagram of example cumulative distribution functions.

FIG. 3 shows graphs of cumulative distribution functions 302, which represent the red, green, and blue channels respectively for a particular region of an image. (The oval surrounding three of the curves in the graph shows which curves represent cumulative distribution functions 302. Another oval shows a different set of cumulative distribution functions 304, which are discussed later. Additionally, the legend toward the right of the drawing shows that a solid pattern represents a CDF for the red channel, a dotted pattern represents a CDF for the green channel, and an interrupted line pattern represents a CDF for the blue channel.) In this example, each of the CDFs intersects the vertical axis at a value of about 0.1, which indicates that, in each channel, about 10% of the pixels have a value of zero. On the other side of the graph (marked on the horizontal axis by 255), all of the functions have a value of 1.0, indicating that 100% of the pixels have values that are less than or equal to 255. (Since 255 is the highest value possible in an 8-bit channel, it stands to reason that 100% of the values would be less than or equal to 255.) In between these two extremes, the CDFs show where the different values in each channel tend to cluster, and where they tend to be sparse. In particular, steep portions of the curve correspond to areas where many pixels have the indicated values, and flat areas of the curve indicate areas where few pixels have the indicated values. For example, the curves in this example all have their steepest portions somewhere between the zero and 255 extremes (e.g., at about 45), indicating that there are many pixels that have values near 45 in each channel. The curves are flatter toward the extreme values of zero and 255, indicating that few pixels have these extreme values.

However, it will also be observed that, in this example, the distribution of values is different in each channel. For example, the blue channel is flatter near the zero values than the red or green channels. For reasons discussed above, the shape of the curve indicates that approximately ten percent of the pixels have zero values in the blue channel, but the flat shape of the curve to the right of zero indicate that very few pixels have low positive values in the blue channel. Each of the CDFs increases monotonically, but only goes up when pixels have values in a particular range. If the curve is flat on the interval [A,B], this flatness indicates that no pixels have values that are between A and B. Thus, if the curve is almost flat (very low slope) on the interval [A,B], this "almost flatness" indicates that there is a very small number of pixels that have values between A and B. The near flatness of the blue curve just to the right of the vertical axis up to about twelve indicate that, in the blue channel, there are very few pixels that have positive values less than or equal to 12.

Certain visual properties are associated with particular shapes of a CDF. For example, haze tends to be associated with flat regions toward the left side of a CDF. This feature of a hazy photograph tends to manifest particularly prominently in the blue channel. Correction of the haze involves rounding out the CDF curves to avoid these flat regions on the left. Returning to FIG. 2, this removal of the flat region may be achieved by left-clipping each channel's CDF to remove the flat region (at 206), and then re-scaling the CDF to stretch it out over the removed left side (at 208). In order to remove the flat region, the flat region first has to be identified. One way to identify the flat region is to define a threshold slope, and to consider the left side of the curve part of the flat region until the slope exceeds some threshold value. For example one might define a slope threshold of 0.001, so that the curve is considered flat up to the leftmost point where the slope exceeds 0.001. In one example, the threshold is set to 0.0007 for the red and green channels, and 0.001 for the blue channel.

Returning again to FIG. 3, some example left-clipping values are shown. In the red and green channels the flat portions of the curve are (in this example) those portions where the value is five or less, and in the blue channel the flat portion is (in this example) where the value is twelve or less. (These clipping points are shown by the vertical dotted lines extending from the five and twelve points on the horizontal axis.) The portions of the curve that are considered flat depends on the shape of the curve and the particular slope threshold that is being applied; the actual numbers used to illustrate this points are merely examples and do not limit the subject matter herein.

The rescaling of the CDF (at 208, FIG. 2) stretches the CDF toward the left after the flat portion on the left has been clipped. The result is a CDF that represents pixel values being somewhat darker overall, but with the colors more richly distributed throughout the full color depth that is supported by the channel width. This modification tends to lead to a less hazy looking photograph. Cumulative distribution functions 304 (in FIG. 3) are the version of functions 302 that have been re-scaled by stretching them toward the left. (The thinner lines represent the original CDFs, and the thicker lines represent the re-scaled CDFs. E.g., the thin dotted line is the original CDF for the green channel; the thick dotted line is the re-scaled CDF for the green channel.) It will be observed that a particular value on the vertical axis (e.g., 0.8) has a lower value in the re-scaled CDFs than in the original CDFs. For example, if a pixel value of 100 corresponds to 0.8 in the original CDF for the blue channel, then in the re-scaled CDF, the pixel value of 80 might correspond to 0.8. In other words, in the original CDF, 80% of the pixels had values in the range zero to 100; in the re-scaled CDF, 80% of the pixels have values in the range zero to 80. Thus, the re-scaled CDF represents a darker picture.

Figure 4:
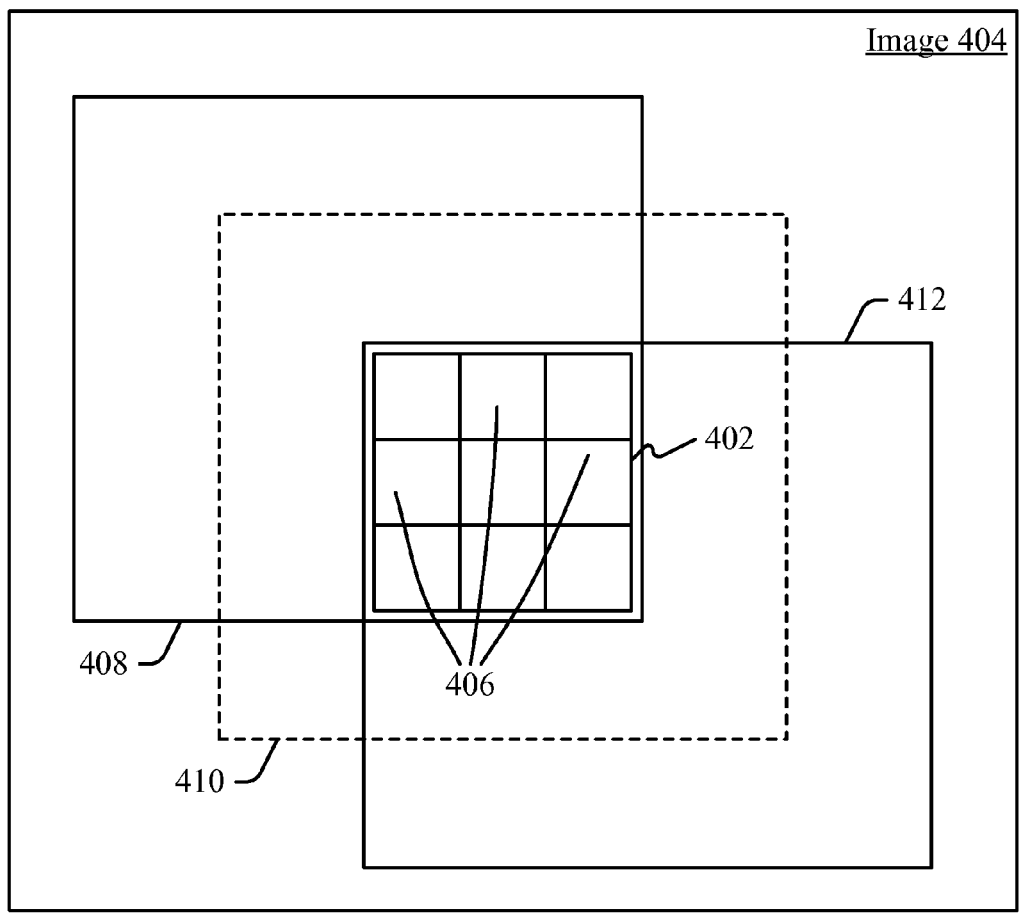
FIG. 4 is a block diagram showing examples of sub-images and super-images.

The foregoing example describes calculating a single CDF for each RGB channel of a photograph. However, in one example, several CDFs are calculated, and the results are combined in a weighted average. Thus, for a given photograph, and for each channel in that image, a CDF may be calculated for the photograph itself, and for several sub-images and super-images. FIG. 4 shows an example of sub-images and super-images.

In FIG. 4, photograph 402 is part of a large image 404 that is being stitched together from several photographs (one of which is photograph 402). Photograph 402 can be divided into several sub-images 406. In the example of FIG. 4, photograph 402 is divided into nine sub-images, each of which is a rectangle that has one-third the length and one-third the width of photograph 402. (In one example, photograph 402 is a square, in which case each of the sub-images may also be a square.) Additionally, photograph 402 may be viewed as being part of one or more super-images, such as super-images 408, 410, and 412. (The super-images are shown alternately in solid and broken lines. The different styles of the lines are intended merely to help the reader of this document to separate visually the different super-image boundaries.) Each of super-images 408-412 is larger than photograph 402, but includes the area covered by photograph 402. Super-image 408 includes photograph 402 in its lower right-hand corner. Super-image 410 includes photograph 402 in its center. Super-image 412 includes photograph 402 in its upper left-hand corner. In one example, each sub-image is a 150 meter by 150 meter square, and each super-image is a 2 kilometer by 2 kilometer square. Moreover, in one example, CDFs are created for the photograph itself, nine sub-images of the photograph, and nine super-images of the photograph, thereby resulting in nineteen CDFs. (Or, more precisely, in this example, there may be fifty-seven CDFs: nineteen for each of the red, blue, and green color channels.) Each of the CDFs may be analyzed, clipped, and re-scaled as described above.

When the nineteen CDFs for a given color channel are created, each CDF can be used to generate a value for that color channel at each pixel. The actual value that is assigned to a pixel may be a weighted average of the values that would be chosen by the various CDFs. The weighted average may be calculated in any appropriate manner. The following formula is one example way to calculate the weighted average:

$$R = \omega \cdot H(R_0) + (1-\omega) \cdot \frac{\sum_L (w_L \cdot L(R_0)) + \sum_S (w_S \cdot S(R_0))}{\sum_L w_L + \sum_S w_S}$$

In this example formula, $R_0$ refers the original photographs pixel values in the red channel, $\omega$ is a parameter that defines the relative significance of the CDF for the original photograph versus the CDFs for the sub- and super-images, and H, L, and S are mappings that are used to convert original pixel values into new pixel values based on the clipped and re-scaled CDF. Thus, if the original photograph is analyzed, clipped, and re-scaled as described above, then each pixel value is likely to be shifted slightly downward. Thus, mapping H might contain a set of correspondences between original and new pixel values as follows:

| Original value | New value |
|---|---|
| 255 | 255 |
| 254 | 252 |
| 253 | 250 |
| 252 | 249 |
| ... | ... |

Thus, if a particular pixel for the original photograph has a value of 254 in the red channel (i.e., if $R_0$=254), then H(254)=252, thereby making the pixel somewhat darker. In addition to mapping H, which is based on the CDF for the actual photograph, each super-image has its own mapping L, and each sub-image has its own mapping S, so (in this example) there are nine L mappings and nine S mappings. These mappings work similarly to H, in that they take an original pixel value in a particular color channel and convert that value to a new value. The exact mapping is determined by the analysis, clipping, and re-scaling of a particular sub- or super-image's CDF.

What the above formula for R does is to take into account the value produced by each of the nineteen mappings, and to find a weighted average of this value. The parameter $\omega$ determines the relative influence of the mapping H versus the combined influence of all of the mappings L and S. In one example, $\omega$=0.2, so that H counts for 20%, and all of the other mappings combined count for 80%. Also, within the term of the above formula that contains a quotient of sums, the terms $w_L$ and $w_S$ are weights that are used to determine how much influence a pixel value produced by a given mapping will have among all of the sub- and super-images. In one example, the influence that a particular sub- or super-image's CDF has on the final weighted average is based on the distance between the pixel and the center of the sub- or super-image. Thus, in this example, when a pixel is close to the center of a given sub- or super-image, then that sub- or super-image's mapping will have more influence. Conversely, in this same example, when a pixel is further from the center of the sub- or super-image, then that sub- or super-image's mapping will have less influence. Thus, for each given mapping L or S, the weight $w_L$ or $w_S$ may be calculated by the formula exp(−d/cellSize), where cellSize is the size of a given sub- or super-image (e.g., the length of a side of the square that defines the sub- or super-image).

The foregoing describes the weighting formula in terms of the red channel. The same technique may be used for the blue channel, and for the green channel. E.g., the final value for a pixel in the red channel may be the weighted average of nineteen mappings that relate to the red channel; the final value for a pixel in the blue channel may be the weighted average of the nineteen mappings that relate to the blue channel; and the final value for a pixel in the green channel may be the weighted average of the nineteen mappings that relate to the green channel.

Returning to FIG. 2, that figure shows that, at 210, for each of the red, green, and blue channels, a new pixel value may be calculated as a weighted average of the mappings generated from the new (clipped and re-scaled) CDFs. It will be appreciated that the formula described above is one example way to calculate such weighted averages, although any appropriate formula or weighting technique may be used.

Once the mappings have been created based on the clipped and re-scaled CDFs, and have been applied to the original pixel values in an appropriate manner (such as the weighted average technique described above), the result is a new set of color values for the photograph (at 212), which are used to replace the original color values. The new set of color values is haze-corrected, in the sense that the photograph may appear less hazy than the original photograph.

Photographs that are being stitched together (whether haze-corrected or not) may be color balanced, in order to smooth out variations in the overall color in each photograph. This smoothing process may make the transitions between photographs less apparent. One way in which color imbalance across photographs manifests itself is in differences in the overall luminosity and saturation of the photographs. Thus, the example color-balancing process described herein seeks to smooth out variations in the luminosity and saturation across photographs that are represented in HSL color space. (Processes for converting between RGB space and HSL space are generally known.)

At a high-level, the color-balancing process looks for "tie points" in the image that is being stitched together from several photographs, and seeks to model changes in the luminosity and saturation as functions of the coordinates of the pixels. An understanding of what a tie point is can be gained with reference to FIG. 5.

Figure 5:
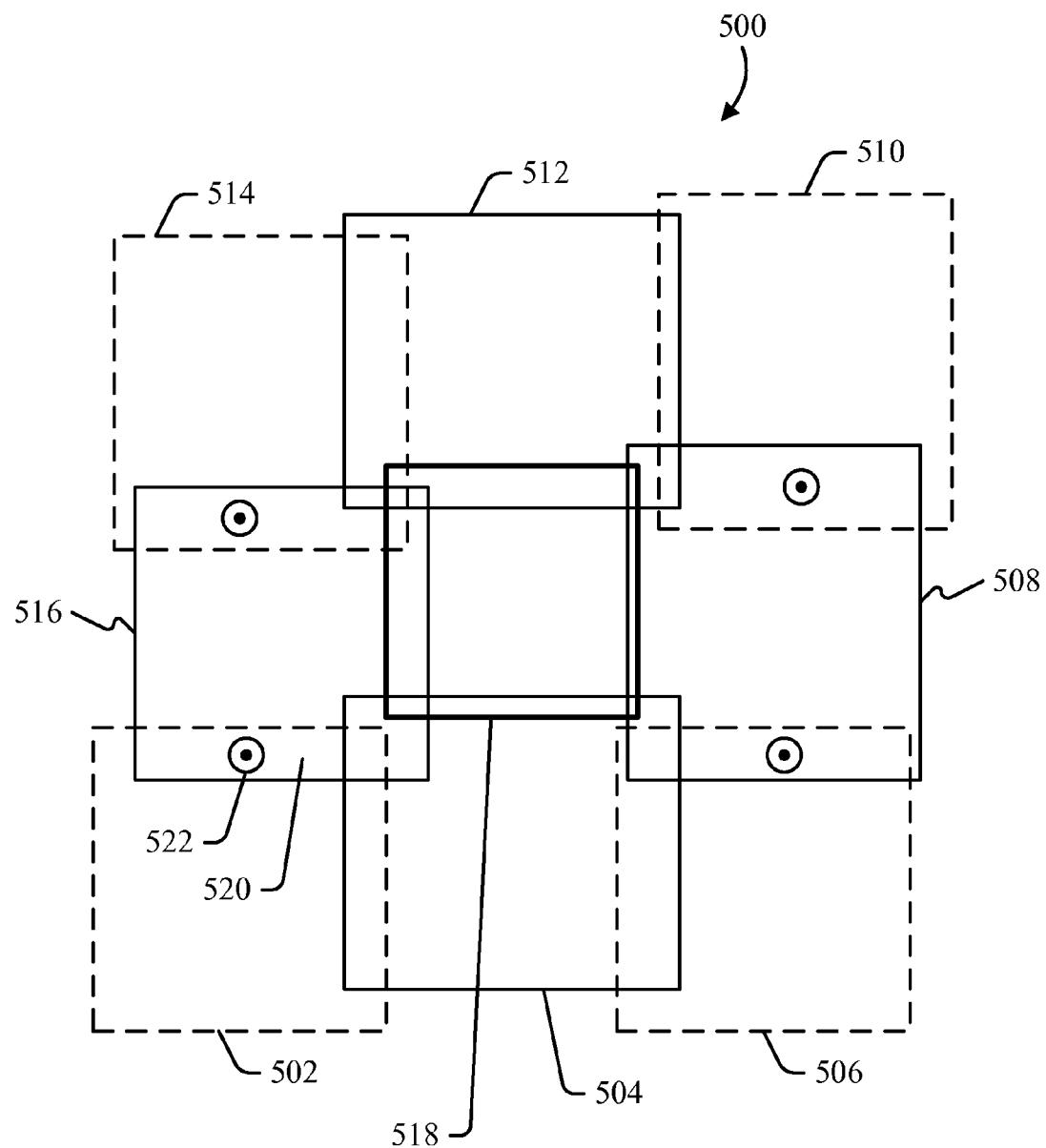
FIG. 5 is a block diagram showing examples of tie points.

FIG. 5 shows an example of an image 500 that has been stitched together from several photographs 502, 504, 506, 508, 510, 512, 514, 516, and 518. (Some of these photographs are shown with solid lines, and others with broken lines. The differing line styles are used only to make it easier for the reader of this document to distinguish the depicted photograph boundaries more easily.) As can be seen, the various photographs 502-518 overlap somewhat as to the regions that they depict. For example, if photographs 502-518 are aerial photographs of a geographic region taken from a moving airplane, some of the photographs may show overlapping regions at their edges. (In some cases, the photographs may have been taken during separate fly-overs of the same region, which may have occurred days or weeks apart from each other.) Thus, photographs 502 and 516 overlap in region 520, and several other overlapping regions are also shown. When attempting to balance color across the different photographs, these regions are of interest because they may depict the same objects even though—due to differences in lighting and other conditions—may have different color balances.

Tie points are selected from the overlapping regions. A tie point is a pixel that corresponds to a given point on the underlying terrain (or other object) that is being photographed. For example, tie point 522 is a point in region 520, and that point may have been selected as a tie point because it appears both in photograph 502 and in photograph 516. Several other tie points are shown in FIG. 5; for the purpose of illustration, these tie points are marked by a dot inside a circle. Not every point that appears in an overlapping region makes an acceptable tie point. Techniques for choosing appropriate tie points are described below, in connection with FIGS. 6-9.

With this understanding of tie points, an example process of color balancing is now described with reference to FIGS. 6-10 (which includes the tie point selection process of FIGS. 6-9).

Figure 6:
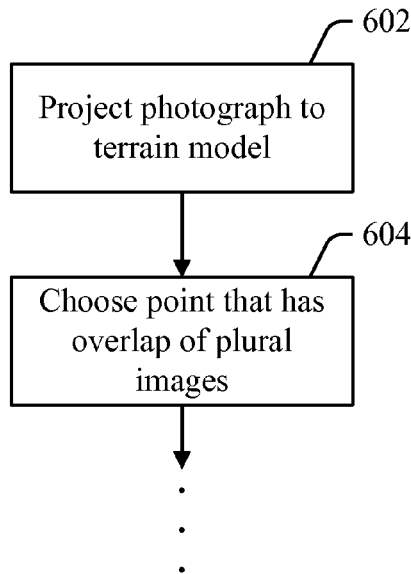
FIG. 6 is a flow diagram of an example process of choosing a candidate tie point.

FIG. 6 shows an example process of choosing a tie point candidate. At 602, the photographs that are being used to stitch together an image are projected to a 3-D model of the underlying object that appears in the photograph. For example, if the object being photographed is a geographic region, a 3-D model may exist of the terrain of that region, representing rolling hills, rivers, etc. While photographs are flat (i.e., 2-D), they may be "painted" onto this terrain, using processes that are known. Thus, any pixel in the photograph corresponds to some point on the 3-D model. Regions of the model that can receive data from two or more photographs are overlapping regions, and the tie point candidates are selected from these regions at 604. (In one example, the tie points are chosen to be approximately twenty meters apart.)

Figure 7:
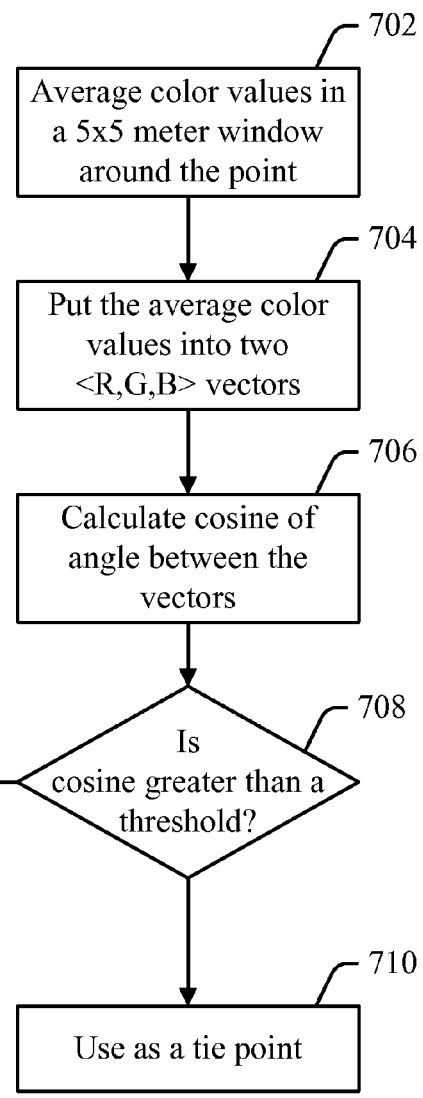
FIGS. 7-9 are flow diagrams of example ways of declaring that a point is appropriate for use as a tie point.
Figure 8:
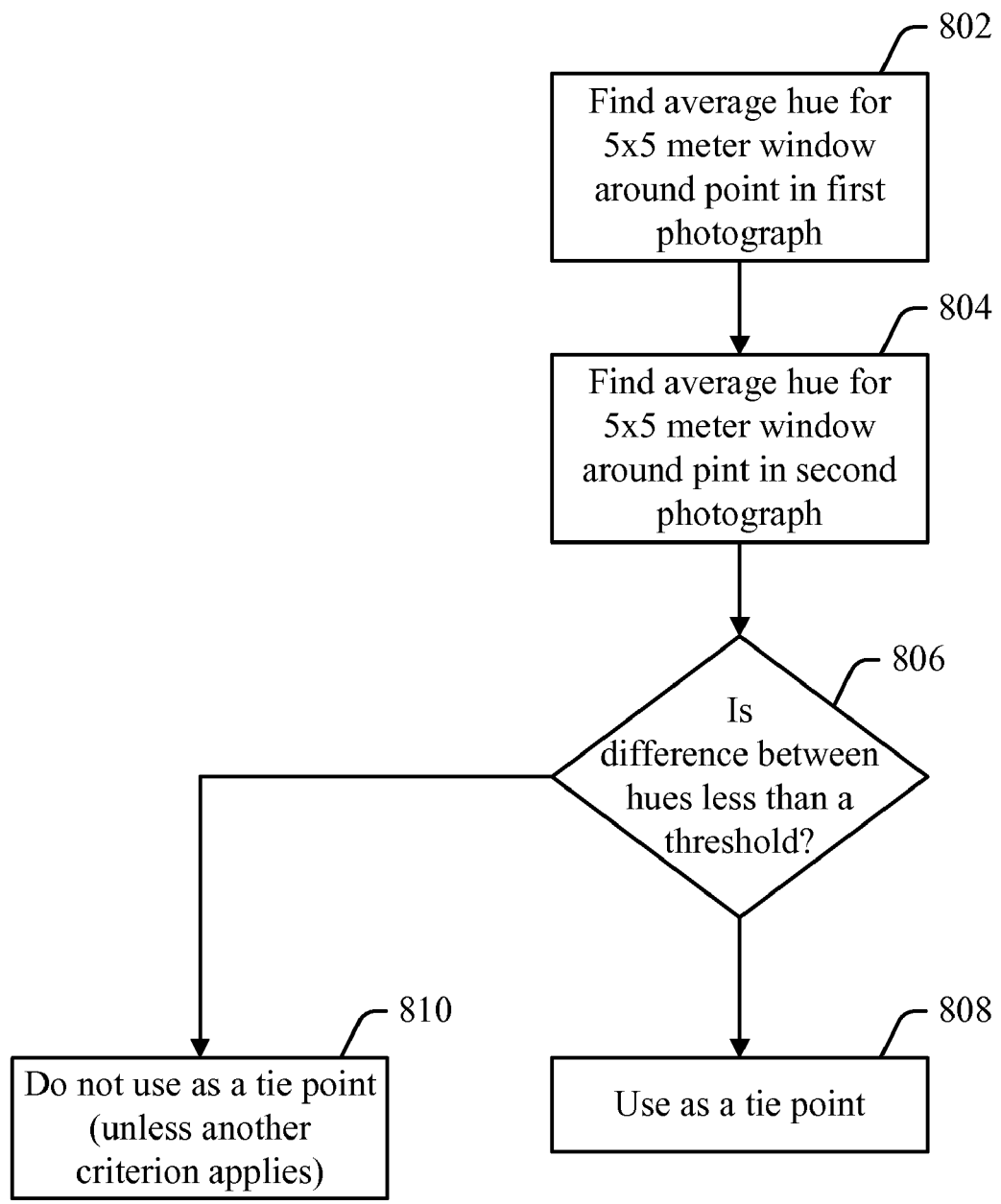
Figure 9:
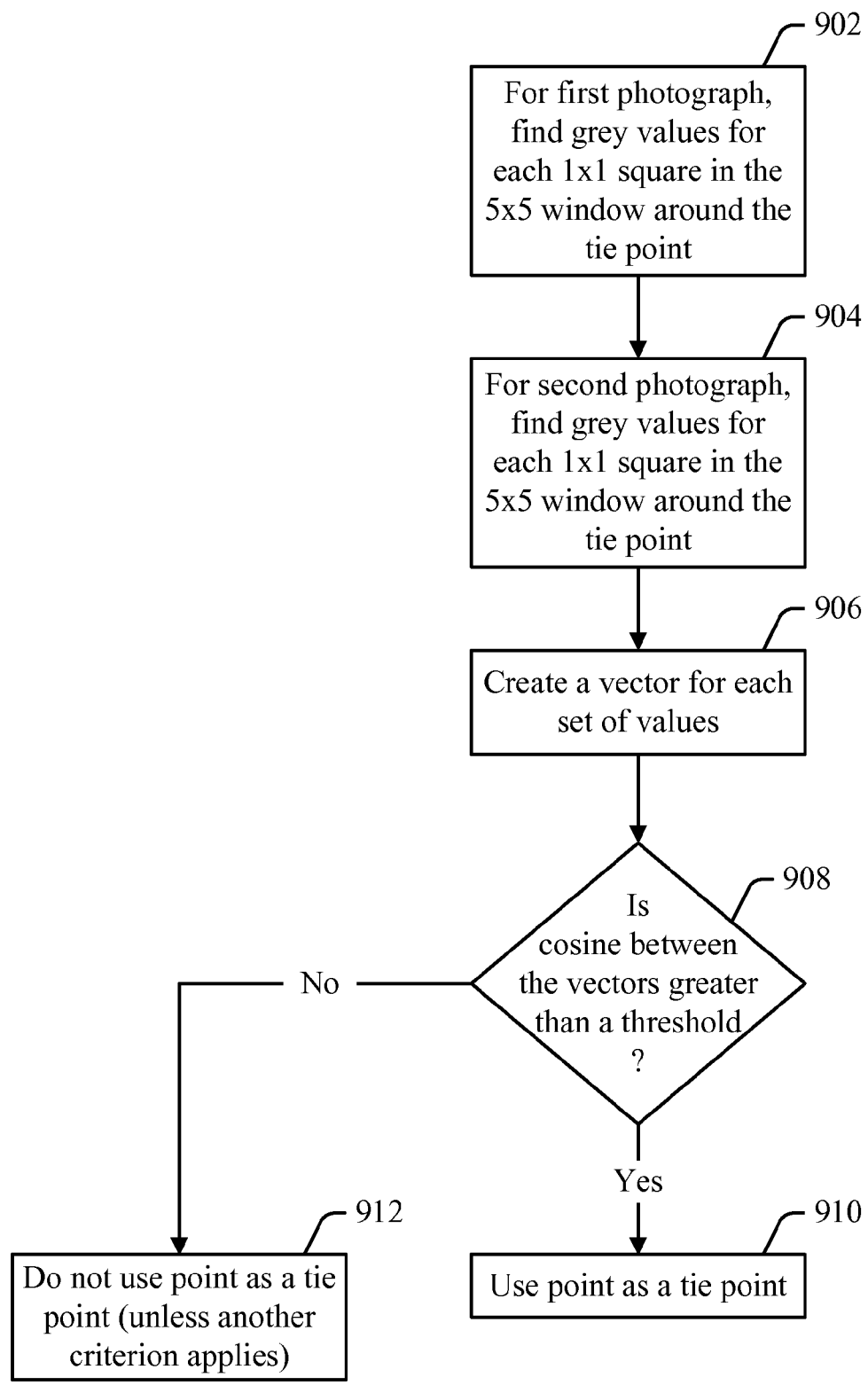

Once the overlapping photographs containing the candidate tie point have been identified, these photographs may be compared, at the pixel that corresponds to the candidate tie point, to determine whether the candidate point will, in fact, make an appropriate tie point. FIGS. 7-9 show example processes of determine whether to use a tie point. A first way of declaring that the candidate point is an appropriate tie point is shown in FIG. 7.

The process of FIG. 7 considers a square around the point (e.g., a 5 meter by 5 meter square), in image space. For this square, the average values are calculated for each of the red, green, and blue channels (at 702). The averages are calculated for both of the photographs that contain the point, thereby resulting in two three-dimensional vectors, each containing three values: one for red, one for green, and one for blue (at 704). In mathematical terms, there are two vectors $\langle r_1, g_1, b_1 \rangle$ and $\langle r_2, g_2, b_2 \rangle$, where r, g, and b represent the red, green, and blue averages, respectively, and the subscripts represent the first and second photographs, respectively.

At 706, the cosine between the two vectors is calculated. If two vectors point in similar directions (i.e., if they have similar ratios between their red, green, and blue values), then the cosine between the vectors tends to be close to 1.0, while vectors that point in different directions have smaller cosines. In other words, the cosine calculation takes into account the direction of the vectors, but not their magnitudes. At 708, it is determined whether the cosine has a value that is greater than some threshold (e.g., 0.999). If the cosine exceeds the threshold, then the candidate point may be used as a tie point (at 710). Otherwise, the candidate point is not appropriate for use as a tie point (at 712), unless some other criterion applies. (Non-limiting examples test for such other criteria are described in FIGS. 8 and 9.)

A second way of declaring that a candidate point is appropriate for use as a tie point is shown in FIG. 8. First, the average hue in a square around the tie point (e.g., in a 5 meter by 5 meter square) is found for each of the photographs (at 802 and 804). The hue may be considered in HSL space, where the hue is represented as a particular number of degrees around a color wheel. The hues then can be compared. At 806, it is determined whether the number of degrees between the hues is less than some threshold. For example, the threshold might be fifteen degrees. In that example the difference between 200 and 210 degrees would be considered under the threshold (as would the difference between 355 and 5 degrees, due to the wrap-around property of the color wheel), but the difference between 200 and 220 degrees would exceed the threshold. If the difference between the hues is less than the threshold, then the point is appropriate for use as a tie point (at 808). Otherwise, the point is not appropriate for use as a tie point (at 810), unless some other criterion applies.

A third way to declaring that a candidate point is appropriate for use as a tie point is shown in FIG. 9. First, a grey vector is created for the region around each of the tie points. One way of creating the grey vector is as follows. For a given window size around a point (e.g., a 5 meter by 5 meter square), divide the window into smaller sub-regions (e.g., twenty-five squares that are each 1 meter by 1 meter), and find the aggregate weighted average of the red, green, and blue values for each of the smaller squares. Find these values for both of the photographs (blocks 902 and 904). Then, create two vectors, one for each of the photographs (block 906). For example, for each of the 1 meter by 1 meter squares being considered in the first photograph, one may add up all of the red, green, and blue values for all of the pixels in a given square, and divide that sum by three times the number of pixels, thereby giving the average of all the red, green, and blue values for all of the pixels in that square. Thus, mathematically, if there are n pixels in a 1 meter by 1 meter square, and if $r_i$, $g_i$, and $b_i$ are the red, green, and blue values, respectively of the $i^{th}$ pixel, then the aggregate average for that square is $$g = \frac{r_1 + \ldots + r_n + g_1 + \ldots + g_n + b_1 + \ldots + b_n}{3n}.$$

(In one example, the red, green, and blue may be weighted as follows: red weight=0.299; green weight=0.587; and blue weight=0.114.) This calculation is repeated for each of the twenty-four remaining squares. The result is put into a vector of the form $\langle g_{1,1}, g_{1,2}, \ldots, g_{1,25} \rangle$. Then, the same may be done with the twenty-five squares in the second photograph, resulting in a vector of the form $\langle g_{2,1}, g_{2,2}, \ldots, g_{2,25} \rangle$. (In the subscript, the first number indicates the photograph to which the value relates (photograph 1 or 2), and the second number indicate which of the twenty-five squares (1 through 25) the value relates.) Thus, there are (in this example) two twenty-five-dimensional vectors that can be compared by calculating the cosine between the vectors. At 908, it is determined whether the cosine between the vectors is greater than some threshold (e.g., greater than 0.92). If so, then the point is appropriate for use as a tie point (at 910). Otherwise, the point is not appropriate for use as a tie point unless some other criterion applies.

While FIGS. 7-9 show different techniques for qualifying a point as a tie point, it is noted that a unifying theme may be discerned across these different techniques. In particular, tie points are particularly effective when the regions around the tie point have some level of visual similarity to each other. The technique of FIG. 7 attempts to detect this visual similarity by comparing the overall red/green/blue ratios in the vicinity of the tie point. The technique of FIG. 8 attempts to detect this visual similarity by comparing the average hue in the vicinity of the tie point. The technique of FIG. 9 attempts to detect this visual similarity by flattening the color in the vicinity of the point into a grey space, and comparing the grey texture pattern between the two photographs. All of these techniques reflect slightly different views of what constitutes visual similarity. In addition to the techniques shown, other techniques may be used to detect visual similarity between two photographs in the vicinity of a tie point. (It is noted that the technique of FIG. 9 is particularly effective in analyzing aerial photographs of downtown urban areas, and allows many tie points to be used that would be rejected under the other criteria.)

Figure 10:
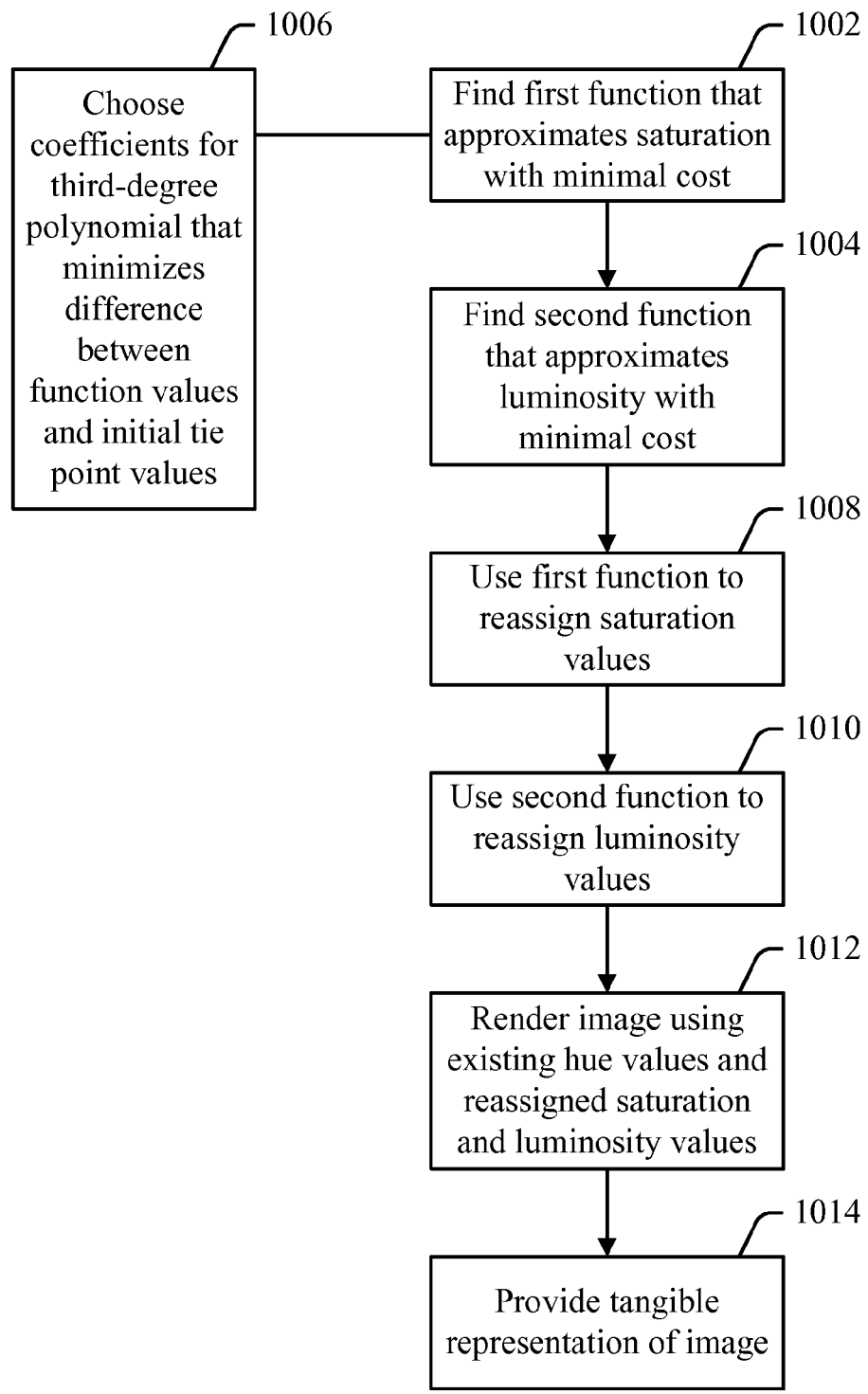
FIG. 10 is a flow diagram of an example process of reassigning saturation and luminosity values and of rendering the image.

Once the tie points have been chosen, the tie points may be used to reassign the saturation and luminosity values in the image, and to render the image with the reassigned values. FIG. 10 shows an example process of reassigning saturation and luminosity values and of rendering the image. At 1002, the process finds a first function that approximates the actual saturation values at the tie points, with minimal cost. Similarly, at 1004, the process finds a second function that approximates the actual luminosity values at the tie points, with minimal cost. That is, assume that the location of any point in the image is described by a pair of coordinates (x and y), and that the $i^{th}$ tie point (at location $(x_i, y_i)$) has the initial saturation value $s_i$. The function that approximates the saturation value is $f(x, y) \to \hat{s}$. The goal of choosing the function that approximates the saturation value is to choose $f$ in such a way that the cost of using $\hat{s}$ at the tie points, instead of the actual saturation values of those tie points, is small. Similarly, as to luminosity, it is assumed that the $i^{th}$ tie point, at location $(x_i, y_i)$, has the initial luminosity value $l_i$, and there is a function $g(x, y) \to \hat{l}$ that approximate the luminosity value for a given point (x, y). The goal of choosing function g is to do so in a way that minimizes the cost of using the function-generated $\hat{l}$ values at the tie points instead of the actual luminosity values at the tie points. (It is noted that "minimizing" the values refers more to an aspiration than a result; it is possible that the function that is chosen will have a cost that is not as low as the theoretical minimum. The actions at 1002 and 1004 attempt to find functions that make the cost very low, although they may or may not succeed. In the claims of the present application, actions that are described as "minimizing" the cost will be understood to include actions that attempt to find a low cost, even if they do not actually succeed at finding the theoretical minimum cost.)

In one example, the saturation and luminosity channels are modeled as $V_0 \cdot \exp(P(x, y))$, where $V_0$ is the initial value of a pixel in that channel, "exp" is the exponential function that raises e to the power of its argument, and P is a polynomial function of the form $P(x, y) = a_{33}x^3y^3 + a_{32}x^3y^2 + a_{23}x^2y^3 + a_{22}x^2y^2 + a_{21}x^2y + a_{12}xy^2 + a_{11}xy + a_{10}x + a_{01}y + a_{00}$, where the $a_{ij}$ values are coefficients. The functions $f$ and $g$ mentioned above may take this form. That is, if $S_0$ and $L_0$ represent the initial pixel values in the saturation and luminosity channels, respectively, and $P_S$ and $P_L$ are two third-degree polynomial functions, then $f(x, y) = S_0 \cdot \exp(a_{33}x^3y^3 + a_{32}x^3y^2 a_{23}x^2y^3 + a_{22}x^2y^2 + a_{21}x^2y + a_{12}xy^2 + a_{11}xy + a_{10}x + a_{01}y + a_{00})$, and $g(x, y) = L_0 \cdot \exp(b_{33}x^3y^3 + b_{32}x^3y^2 + b_{23}x^2y^3 + b_{22}x^2y^2 + b_{21}x^2y + b_{12}xy^2 + b_{11}xy + b_{10} + b_{01}y + b_{00})$. Moreover, the process of minimizing the cost involves choosing the appropriate coefficients $a_{ij}$ and $b_{ij}$ (at 1006).

As to the cost itself, one way to calculate the cost is as the sum of two components, which may be called m and n. The first component, m, is based on the pairwise difference between all images that overlap at the tie point, and the second component, n, is based on the difference between each of the images that overlap at the tie point and the initial value at that point. m may be called the "smoothness" term, and n may be called the "data" term. The smoothness term may minimize differences, and the data term may keep results close to measured values. Thus, $$m = \sum_{i \neq j} \left( \frac{L_i - L_j}{L_i + L_j + \epsilon} \right)^2 + \left( \frac{S_i - S_j}{S_i + S_j + \epsilon} \right)^2, \quad n = \sum_i ((L_i - L_0)^2 + (S_i - S_0)^2),$$

where $L_i$, $L_j$, $S_i$, and $S_j$ are specific luminosity and saturation values for the $i^{th}$ and $j^{th}$ photograph that overlaps at the tie point. Then, the cost function, C, is: $C = m + \lambda n$, where $\lambda$ is a parameter that controls the relative influence of m and n. (In one example, $\lambda = 0.1$.) It is noted that this example cost function calculates the combined cost of using a particular combination of saturation and luminosity functions, although in theory separate costs for saturation and luminosity could be defined.

It is noted that, in the foregoing examples, the particular functions shown are merely examples. Other types of functions may be used to model saturation, luminosity, and cost. Moreover, the use of a third-degree polynomial function is merely an example; the function may be any degree, and may or may not be a polynomial. Any other appropriate modifications may be made to the functions described above.

Once the first function (to generate saturation), and the second function (to generate luminosity) have been chosen, these functions may be used to reassign the actual saturation and luminosity values across the entire image (not merely at the tie points) (at 1008 and 1010). That is, for any given pixel in the image that starts with the initial value (h°, s, l), the reassignment that takes place at 1008 and 1010 changes this value to (h°, ŝ, l̂), where ŝ and l̂ are the values generated by the first and second functions, respectively. (I.e., those functions that were found at 1002 and 1004.)

Once the pixel values have been reassigned in this manner, the image is rendered using the reassigned values (at 1012). Once the image has been rendered, the rendered image may be provided in tangible form (at 1014)—e.g., by performing physical transformations to the components of a display device in order to display the image to a user.

The result of the foregoing may be a set of stitched photographs that have been corrected for haze, and that have been color-balanced across the different photographs.

Figure 11:
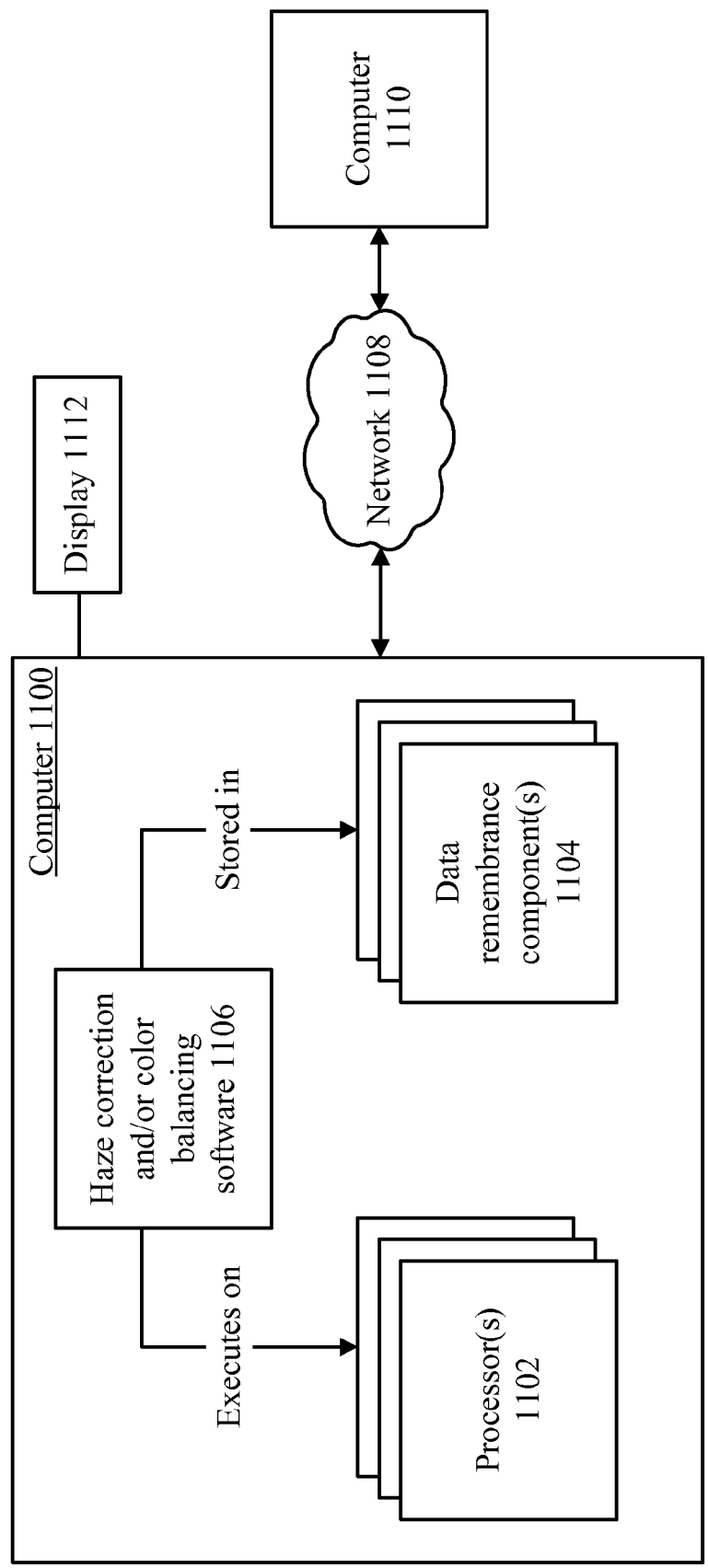
FIG. 11 is a block diagram of example components that may be used in connection with implementations of the subject matter described herein.

FIG. 11 shows an example environment in which aspects of the subject matter described herein may be deployed.

Computer 1100 includes one or more processors 1102 and one or more data remembrance components 1104. Processor(s) 1102 are typically microprocessors, such as those found in a personal desktop or laptop computer, a server, a handheld computer, or another kind of computing device. Data remembrance component(s) 1104 are components that are capable of storing data for either the short or long term. Examples of data remembrance component(s) 1104 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 1100 may comprise, or be associated with, display 1112, which may be a cathode ray tube (CRT) monitor, a liquid crystal display (LCD) monitor, or any other type of monitor.

Software may be stored in the data remembrance component(s) 1104, and may execute on the one or more processor(s) 1102. An example of such software is haze correction and/or color balancing software 1106, which may implement some or all of the functionality described above in connection with FIGS. 1-10, although any type of software could be used. Software 1106 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 11, although the subject matter described herein is not limited to this example.

The subject matter described herein can be implemented as software that is stored in one or more of the data remembrance component(s) 1104 and that executes on one or more of the processor(s) 1102. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 1102) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 1100 may be communicatively connected to one or more other devices through network 1108. Computer 1110, which may be similar in structure to computer 1100, is an example of a device that can be connected to computer 1100, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to balance color in an image that is made of plural photographs, wherein the executable instructions, when executed by a computer, cause the computer to perform acts comprising:
    projecting said photographs to a 3-D model;
    finding regions on said 3-D model where two or more of said photographs overlap;
    choosing tie points in said regions, wherein each of said tie points corresponds to a pixel of said image, and wherein a location of each pixel in said image is identified by coordinates;
    finding a first function that generates a saturation value based on a pixel's coordinates;
    finding a second function that generates a luminosity value based on a pixel's coordinates, wherein said first function and said second function are chosen to minimize a cost of using said first function's value instead of said tie points' initial saturation values and said second function's value instead of said tie points' initial luminosity values;
    using said first function to generate saturation values for all pixels in said image;
    using said second function to generate luminosity values for all pixels in said image;
    for pixels in said image, reassigning said pixels' saturation and luminosity values based on values generated by said first function and said second function, respectively; and
    rendering said image with reassigned saturation and luminosity values.

2. The one or more computer-readable storage media of claim 1, wherein said acts further comprise:
    performing haze correction on said image.

3. The one or more computer-readable storage media of claim 2, wherein said haze correction comprises:

creating a plurality of cumulative distribution functions (CDFs) that comprise a CDF for each of the red, green, and blue channels of a first one of said photographs;

left-clipping each of the CDFs;

re-scaling the CDF to cover a clipped portion of each CDF, to create re-scaled CDFs; and mapping the red, green, and blue values for each pixel of the first one of said photographs using the re-scaled CDFs.

4. The one or more computer-readable storage media of claim 3, wherein said left-clipping comprises:

setting a threshold slope value and clipping each CDF from zero up to a point at which a slope of the CDF exceeds said threshold slope value.

5. The one or more computer-readable storage media of claim 3, wherein said CDFs further comprise a CDF for each of the red, green, and blue channels of a plurality of super-images of said first one of said photographs, and wherein said mapping comprises using, for each of the red, green, and blue channels, an average of values derived from the CDFs of the first one of said photographs and values derived from the CDFs of said super-images.

6. The one or more computer-readable storage media of claim 3, wherein said CDFs further comprise a CDF for each of the red, green, and blue channels of a plurality of sub-images of said first one of said photographs, and wherein said mapping comprises using, for each of the red, green, and blue channels, an average of values derived from the CDFs of the first one of said photographs and values derived from the CDFs of said sub-images.

7. The one or more computer-readable storage media of claim 3, wherein said CDFs further comprise:

a CDF for each of the red, green, and blue channels of a plurality of sub-images of said first one of said photographs; and a CDF for each of the red, green, and blue channels of a plurality of super-images of said first one of said photographs;

and wherein said mapping comprises using, for each of the red, green, and blue channels, an average of values derived from:

the CDFs of the first one of said photographs;
the CDFs of said sub-images; and
the CDFs of said super-images.

8. The one or more computer-readable storage media of claim 7, wherein said average comprises a weighted average that assigns:

a first weight to the CDFs of the first one of said photographs; and a second weight to a combination of said sub-images and said super-images;

and wherein, within said combination of said sub-images and said super-images, each pixel is assigned a weight based on the pixel's distance from a center of a sub-image or a super-image.

9. The one or more computer-readable storage media of claim 1, wherein said choosing of said tie points comprises:

creating a first vector that contains, for a window around a point in a first one of said photographs, an average value of the red channel, an average value of the green channel, and an average value of the blue channel;

creating a second vector that contains, for a window around said point in a second one of said photographs, an average value of the red channel, an average value of the green channel, and an average value of the blue channel;

finding a cosine of an angle between said first vector and said second vector;

determining that said cosine exceeds a threshold; and based on said cosine's exceeding said threshold, using said point as one of said tie points.

10. The one or more computer-readable storage media of claim 1, wherein said choosing of said tie points comprises:

finding first hue that is an average hue of a window around a point in a first one of said photographs;

finding a second hue that is an average hue of a window around said point in a second one of said photographs;

finding a difference between said first hue and said second hue;

determining that said difference is less than a threshold; and based on said difference's being less than said threshold, using said point as one of said tie points.

11. The one or more computer-readable storage media of claim 1, wherein said choosing of said tie points comprises:

finding an weighted average of the red, green, and blue channels in each of a plurality of regions of a window around a point in a first one of said photographs;

finding an weighted average of the red, green, and blue channels in each of said plurality of regions of said window around said point in a second one of said photographs;

creating a first vector that contains the aggregate average values from said first one of said photographs;

creating a second vector that contains the aggregate average values from said second one of said photographs;

calculating a cosine of an angle between said first vector and said second vector;

determining that said cosine exceeds a threshold; and based on said cosine's exceeding said threshold, using said point as one of said tie points.

12. The one or more computer-readable storage media of claim 1, wherein said cost of using a point as one of said tie points is based on data comprising:

pairwise differences between photographs that contain said point; and differences between each of said photographs pixel values at said point and an initial value for said point.

13. The one or more computer-readable storage media of claim 12, wherein said first function comprises a first polynomial and wherein said second function comprises a second polynomial.

14. The one or more computer-readable storage media of claim 13, wherein said first polynomial and said second polynomial are both third degree polynomials.

15. The one or more computer-readable storage media of claim 13, wherein said first function comprises multiplying a first value by e raised to a power of said first polynomial, and wherein said second function comprises multiplying a second value by e raised to a power of said second polynomial.

16. A method of correcting haze and balancing color in an image made of a plurality of photographs, the method comprising:

using a processor to perform acts comprising:

projecting said photographs to a 3-D model;

removing haze from said photographs by:

creating, for a given photograph, plural cumulative distribution functions (CDFs) for each of the red, green, and blue channels of said given photograph, wherein the plural CDFs for each channel include a CDF based on the given one of the photographs, CDFs based on plural sub-images of the given one of the photographs, and CDFs based on plural super-images of the given one of the photographs;

left-clipping each of the CDFs;
re-scaling each of the CDFs to cover the left-clipped regions of the CDFs;
using the re-scaled CDFs to create maps that map pixel values to lower values; and
for pixels in the given one of the photographs, replacing pixel values in each channel with a weighted average of values from said maps;
finding regions on said 3-D model where two or more of said photographs overlap;
choosing tie points in said regions, wherein each of said tie points corresponds to a pixel of said image, and wherein a location of each pixel in said image is identified by coordinates;
finding a first function that generates a saturation value based on a pixel's coordinates;
finding a second function that generates a luminosity value based on a pixel's coordinates, wherein said first function and said second function are chosen to minimize a cost of using said first function's value instead of said tie points' initial saturation values and said second function's value instead of said tie points' initial luminosity values;
using said first function to generate saturation values for all pixels in said image;
using said second function to generate luminosity values for all pixels in said image;
for pixels in said image, reassigning said pixels' saturation and luminosity values based on values generated by said first function and said second function, respectively; and
rendering said image with reassigned saturation and luminosity values.

17. The method of claim 16, wherein said choosing of said tie points comprises:
finding a candidate point in a region in which two photographs overlap;
comparing said two photographs for visual similarity by:
determining that a first cosine of a first angle between vectors that represent red, green, and blue averages in a window around said candidate point in said two photographs exceeds a first threshold;
determining that an angle between hues of said two photographs in a window around said candidate point is less than a second threshold; or
determining that a second cosine of a second angle between vectors that represent an average of the red, green, and blue values in a plurality of sub-regions of a window around said candidate point in said two photographs exceeds a third threshold.

18. The method of claim 16, wherein said left-clipping of each of the CDFs comprises:
setting a slope threshold; and
clipping each given CDF from zero up to a value at which a slope of the given CDF exceeds said slope threshold.

19. A system for balancing color in an image that is made of plural photographs, the system comprising:
a memory;
a processor;
a color balancing component that is stored in said memory and that executes on said processor, wherein said color balancing component:
projects said photographs to a 3-D model;
finds regions on said 3-D model where two or more of said photographs overlap;
chooses tie points in said regions, wherein each of said tie points corresponds to a pixel of said image, and wherein a location of each pixel in said image is identified by coordinates;
finds a first function that generates a saturation value based on a pixel's coordinates;
finds a second function that generates a luminosity value based on a pixel's coordinates, wherein said first function and said second function are chosen to minimize a cost of using said first function's value instead of said tie points' initial saturation values and said second function's value instead of said tie points' initial luminosity values;
uses said first function to generate saturation values for all pixels in said image;
uses said second function to generate luminosity values for all pixels in said image;
reassigns, for all pixels in said image, said pixels' saturation and luminosity values based on values generated by said first function and said second function, respectively; and
renders said image with reassigned saturation and luminosity values.

20. The system of claim 19, wherein said first function comprises multiplying a first value by e raised to the power of a first third-degree polynomial, and wherein said second function comprises multiplying a second value by e raised to the power of a second third-degree polynomial.

* * * * *